US012116035B2

United States Patent
Anti et al.

(10) Patent No.: US 12,116,035 B2
(45) Date of Patent: Oct. 15, 2024

(54) TDR-BASED SYSTEM FOR DETECTION OF HAND TOUCH POSITIONINGS ON AN OBJECT, PARTICULARLY ON A STEERING WHEEL FOR THE PURPOSE OF HAND GESTURE RECOGNITION

(71) Applicant: IEE INTERNATIONAL ELECTRONICS & ENGINEERING S.A., Echternach (LU)

(72) Inventors: Baptiste Anti, Hettange-Grande (FR); Laurent Lamesch, Reichlange (LU); Thomas Faber, Schweich (DE); Thomas Stifter, Trier (DE); Michael Puetz, Trier (DE); Andreas Fox, Freudenburg (DE)

(73) Assignee: IEE INTERNATIONAL ELECTRONICS & ENGINEERING S.A., Echternach (LU)

( * ) Notice: Subject to any disclaimer, the term of this patent is extended or adjusted under 35 U.S.C. 154(b) by 200 days.

(21) Appl. No.: 17/915,023

(22) PCT Filed: Mar. 25, 2021

(86) PCT No.: PCT/EP2021/057856
§ 371 (c)(1),
(2) Date: Sep. 27, 2022

(87) PCT Pub. No.: WO2021/191401
PCT Pub. Date: Sep. 30, 2021

(65) Prior Publication Data
US 2023/0159080 A1  May 25, 2023

(30) Foreign Application Priority Data
Mar. 27, 2020 (LU) .................................. 101718

(51) Int. Cl.
*B62D 1/04* (2006.01)
*B60K 35/10* (2024.01)
*G06F 3/01* (2006.01)

(52) U.S. Cl.
CPC .............. *B62D 1/046* (2013.01); *B60K 35/10* (2024.01); *G06F 3/017* (2013.01)

(58) Field of Classification Search
CPC .......... B62D 1/046; G06F 3/017; B60K 35/10
See application file for complete search history.

(56) References Cited

U.S. PATENT DOCUMENTS

| 8,841,929 B2 | 9/2014 | Bennett et al. |
| 11,097,764 B2 * | 8/2021 | Lamesch ............... B60R 16/037 |
| 2003/0189493 A1 | 10/2003 | Klausner et al. |

FOREIGN PATENT DOCUMENTS

| DE | 102014117824 A1 * | 6/2016 | ............. B62D 1/046 |
| EP | 1292485 B1 | 2/2004 | |

(Continued)

OTHER PUBLICATIONS

International Search Report for application No. PCT/EP2021/057856, dated May 11, 2021, 3 pages.

(Continued)

*Primary Examiner* — Paresh Patel
(74) *Attorney, Agent, or Firm* — Reising Ethington P.C.

(57) ABSTRACT

A sensing system and method of recognizing a hand gesture established by a sequence of hand touch positionings on an object. The method includes at least steps of: providing to a signal line a time-dependent measurement signal; receiving the measurement signal after being at least partially reflected by at least one portion of the signal line; determining positions on the object of the portions of the signal line that have reflected the measurement signal; comparing an obtained plurality of stored successively determined positions on the object with at least one predefined pattern of (Continued)

successive positions to derive a measure of similarity; and providing an output signal that is indicative of the predefined pattern of successive positions if the derived measure of similarity is lower than a predefined threshold value.

11 Claims, 3 Drawing Sheets

(56) References Cited

FOREIGN PATENT DOCUMENTS

| EP | 2028078 A1 * | 2/2009 | ....... B60R 21/01552 |
| WO | WO-0194188 A1 * | 12/2001 | ............ B62D 1/046 |
| WO | WO-2004022409 A2 * | 3/2004 | ....... B60R 21/01552 |
| WO | 2016096815 A1 | 6/2016 | |
| WO | 2019086388 A1 | 5/2019 | |

OTHER PUBLICATIONS

Written Opinion for application No. PCT/EP2021/057856, dated May 11, 2021, 6 pages.

* cited by examiner

TDR-BASED SYSTEM FOR DETECTION OF HAND TOUCH POSITIONINGS ON AN OBJECT, PARTICULARLY ON A STEERING WHEEL FOR THE PURPOSE OF HAND GESTURE RECOGNITION

TECHNICAL FIELD

The invention relates to a method of recognizing a hand gesture established by a sequence of hand touch positionings on an object, particularly on a steering wheel, a sensing system for detection of hand gestures on an object, particularly on a steering wheel, by carrying out such method, a steering wheel with hand gesture recognition comprising such sensing system, and a software module for automatically carrying out such method.

BACKGROUND

In the field of automotive vehicle sensor application, it is known to employ sensors for so-called Hands off Detection (HOD) systems, in which one or more sensors provide information about whether a driver has his hands on a steering wheel of a vehicle or not. This information can be provided as input to an Automatic Driver Assistance System (ADAS) such as an Adaptive Cruise Control (ACC), which, based on the provided sensor signal, can alert the driver and remind him or her to take control of the steering wheel again. In particular, such HOD systems can be used in support to fulfill a requirement of the Vienna convention that the driver must remain in control of the vehicle at all times. HOD systems may as well be employed in a parking assistance system or an ADAS that is configured for evaluating a driver activity at high speed.

It is further known to employ capacitive sensors in vehicle HOD systems.

By way of example, WO 2016/096815 A1 proposes a planar flexible carrier for use in steering wheel heating and/or sensing of the presence of the driver's hand(s) on the steering wheel. The planar carrier, which can be employed for mounting on a rim of a steering wheel without wrinkles, comprises a portion of planar flexible foil of roughly rectangular shape having two longitudinal sides and two lateral sides. A length B of the lateral sides is 0.96 to 1.00 times the perimeter of the rim. A number of N cut-outs per unit length are provided on each of the longitudinal sides, wherein the cut-outs of one side are located in a staggered fashion relative to opposing cut-out portions on the opposite side. The determining of an optimum shape and size of the cut-outs is described. Further described is a heat carrier, a heating and/or sensing device and methods for their production.

Multi-zone HOD capacitive sensor systems are known in the art that comprise a plurality of distinct and independent sensing zones along the steering wheel. These HOD capacitive sensor systems are capable of distinguishing various ways of holding the vehicle steering wheel by the driver (one hand, two hands, angular position).

For instance, European patent EP 1 292 485 B1 describes a steering wheel for a vehicle, which comprises a steering ring, a hub, and at least one spoke connecting the steering ring and the hub. On the steering ring, sensors are arranged in a distributed manner along the circumference of the steering ring, extending over the entire length of the steering ring. The sensors may be configured for operating on a resistive, capacitive or inductive basis. The sensors are subdivided into a plurality of segments arranged one behind another in the longitudinal direction of the steering ring. The spacing between two segments of a sensor from one another in the longitudinal direction of the steering ring is smaller than a finger width, wherein the segments of the sensors, in the longitudinal direction of the steering ring, are shorter than a finger width. By that, the thumb and the fingers of the hand can be reliably distinguished from each other and a high spatial resolution is achieved.

With such capacitive HOD systems it is only possible to detect a touch positioning or a grasping hand positioning based on dedicated sensor zones. A position detection is only possible based on the sensor area size.

Employment of other sensors has also been proposed for HOD applications. WO 2019/086388 A1 describes a system for detecting whether at least one hand of a user is on a steering wheel. The system is in general based on a time-domain reflectometry (TDR) measurement. The system comprises a signal line that extends from a first point to a second point and is disposed along at least a portion of a surface of the steering wheel. The system further includes a detection unit that is coupled to the first point. The detection unit is configured to send a time-dependent detection signal traveling along the signal line, to receive a reflected signal traveling along the signal line and to detect the presence of a hand on the surface based on the reflected signal.

SUMMARY

It is an object of the invention to provide a sensing system of low complexity that can be employed for at least detecting hand touch positionings on an object, particularly on a steering wheel, in particular a vehicle steering wheel, for the purpose of recognition of hand gestures that are established by a sequence of hand touch positionings on an object, particularly on the steering wheel.

This object is achieved by a method of recognizing a hand gesture established by a sequence of hand touch positionings on an object, particularly on a steering wheel, a sensing system for detection of such hand gestures, and a steering wheel with hand gesture recognition according to the claims.

In one aspect of the present invention, the object is achieved by a method of recognizing a hand gesture established by a sequence of hand touch positionings on an object, particularly on a steering wheel, by operating a sensing system. The sensing system comprises at least one electrically conducting signal line, which is arranged to extend along a part of a surface of the object with a priori knowledge about a relation between a distance of any portion of the at least one signal line from a reference point and information on a position on the object, a signal voltage source that is operatively connectable to each signal line, and a control and evaluation unit that is operatively connectable to each signal line.

The method comprises at least steps of:
by operating the signal voltage source, providing to a signal line a time-dependent measurement signal intended to be traveling along the respective connected signal line,
operating the control and evaluation unit for receiving the measurement signal after being at least partially reflected by at least one portion of the signal line to which the measurement signal has been provided,
operating the control and evaluation unit for determining a position or positions on the object of the portion or portions of the signal line that has or have at least partially reflected the measurement signal,
storing the determined position or positions on the object, repeating the aforementioned steps for a predetermined number of times for obtaining a plurality of stored successively determined positions on the object, comparing the obtained plurality of stored successively determined positions on the object with at least one predefined pattern of successive positions to derive a measure of similarity, and providing an output signal that is indicative of the predefined pattern of successive positions if the derived measure of similarity is lower than a predefined threshold value.

The term "signal", as used throughout this application, shall be understood to mean an electric or electromagnetic signal. The term "(electrically) connected", as used in this application, shall particularly be understood as being electrically connected by a galvanic connection or a capacitive or inductive coupling.

In general, the sensing system for hand positioning detection is based on time-domain reflectometry (TDR), and the provided time-dependent measurement signal intended to be traveling along the respective connected signal line is suitable for TDR measurements. The signal shape of the time-dependent measurement signal may depend on the specific application.

The provided time-dependent measurement signal will be traveling along the respective connected signal line and will at least partially be reflected from any impedance discontinuity along the signal line. Such impedance discontinuities can temporarily be generated by a hand or one or more fingers of the hand of an operator of the object, particularly of the steering wheel, being positioned in proximity to the signal line. The nature of the generated impedance discontinuity or impedance discontinuities is determined by the nature of the hand positioning on the object, particularly the steering wheel.

With the a priori knowledge about a relation between a distance of any portion of the at least one signal line from a reference point and information on a position on the object, the proposed sensing system is enabled to determine positions of detected impedance discontinuities on the object. This information can be exploited for determining hand positioning scenarios on the object such as hand touch positionings.

The proposed method can allow for a high-resolution position detection of a sequence of hand touch positionings, using principles of time-domain reflectometry (TDR). By comparing a plurality of successively determined positions with at least one predefined pattern, recognition of hand gestures that are established by a sequence of hand touch positionings on the object can be accomplished.

The hand gestures that are to be recognized by the proposed method can be assigned to a plurality of various additional functions, for instance comfort functions such as multimedia functions. The sequence of hand touch positionings that are establishing a hand gesture may be executed by one hand or by two hands of the operator of the object. The hand touch positionings may include, without being limited to, single-touch positionings with one hand or two hands, multiple touch positionings with one hand or two hands and hand grasp positionings with one hand or two hands.

Preferably, the step of comparing includes comparing the obtained plurality of stored successively determined positions to a plurality of predefined patterns of successive positions to derive a measure of similarity for each predefined pattern of the plurality of predefined patterns. In this way, a plurality of hand gestures that are established by different sequences of hand touch positionings on the object can be distinguished and recognized in a reliable manner.

Preferably, an execution of the steps of the proposed method can be enabled or disabled by a parameter setting in the sensing system. In this way, the same design of the sensing system can be used with or without the function of hand gesture recognition. Preferably, the parameter setting in the sensing system is designed as a software parameter setting within the control and evaluation unit.

In preferred embodiments of the method, the step of repeating the aforementioned steps includes repeating the steps for a predetermined number of times that corresponds to a time period between 0.5 and 1.5 seconds. In this way, high reliability can be achieved for the recognition of the hand gesture. Further, the method can allow for recognition of complex hand gestures that are carried out by an operator or user of the object, particularly the steering wheel within the described time period.

Preferably, the object is formed by a rim of a steering wheel, and the at least one predefined pattern of successive positions includes a turning point with regard to a circumferential direction of the rim of the steering wheel. In this way, hand gestures established by hand touch positionings that include wiping back and forth can reliably be detected.

In another aspect of the invention, a sensing system for detection of hand gestures established by a sequence of hand touch positionings on an object, particularly a rim of a steering wheel, is provided.

The sensing system comprises at least one electrically conducting signal line, a signal voltage source and a control and evaluation unit.

The at least one electrically conducting signal line is arrangeable to extend along a part of a surface of the object, particularly the rim of the steering wheel, with a priori knowledge about a relation between a distance of any portion of the at least one signal line from a reference point and information on a position on the object.

The signal voltage source is operatively connectable to each signal line and is configured for providing a time-dependent measurement signal to be traveling along the respective connected signal line.

The control and evaluation unit is operatively connectable to each signal line and is configured for:

receiving the measurement signal after being at least partially reflected by at least one portion of the signal line to which the measurement signal has been provided, determining a position or positions on the object of the portion or portions of the signal line that has or have at least partially reflected the measurement signal, storing the determined position on the object, repeating the aforementioned steps for a predetermined number of times for obtaining a plurality of stored successively determined positions on the object, comparing the obtained plurality of stored successively determined positions on the object with at least one predefined pattern of successive positions to derive a measure of similarity, and providing an output signal that is indicative of the predefined pattern of successive positions if the derived measure of similarity is lower than a predefined threshold value.

The phrase "configured to", as used in this application, shall in particular be understood as being specifically programmed, laid out, furnished or arranged.

The proposed sensing system for hand positioning detection on an object, particularly on a steering wheel, can be of low complexity and can be capable of distinguishing various hand gestures that are each established by a sequence of hand touch positionings on the object.

The time-dependent measurement signal can be a pulse signal, as is often used in TDR, but can be a continuous signal as well. In preferred embodiments of the sensing system, the signal voltage source is configured for providing a pulse-shaped signal, a frequency-swept signal, a pseudo random phase-shift keyed signal or a pseudo random signal. This can provide design freedom for appropriately covering a wide range of applications.

In the case of a frequency swept sine wave, the control and evaluation unit may be configured to apply a Fast Fourier Transform (FFT) to the received reflected measurement signal. In the case of a pseudo random phase-shift keyed signal or a pseudo random signal, the control and evaluation unit may be configured to apply a cross correlation between the provided measurements signal and the received reflected measurement signal.

Preferably, the proposed sensing system forms part of a steering wheel of an automotive vehicle, and the object is formed by a rim of the steering wheel. The term "automotive vehicle", as used in this patent application, shall particularly be understood to encompass passenger cars, trucks, semi-trailer trucks and buses, although application to other vehicles such as aircrafts or watercrafts is also contemplated.

In yet another aspect of the invention, a steering wheel with hand gesture recognition by hand touch positioning detection is provided. The steering wheel comprises an embodiment of the sensing system as disclosed herein, wherein the at least one electrically conducting signal line is arranged to extend along a part of a surface of a rim of the steering wheel. The benefits described in context with the sensing system apply to the proposed steering wheel to the full extent.

In particular, the proposed steering wheel is applicable with advantage in the automotive sector; i.e. for use in a vehicle. However, it is also contemplated to employ the proposed steering wheel for aircrafts and sea crafts.

In preferred embodiments, the steering wheel further comprises at least one contiguous portion of a rim of the steering wheel that is identifiable, i.e. identifiable to an operator of the steering wheel, by an outer marking, wherein a portion is or portions of the at least one signal line are arranged on the at least one contiguous portion of the rim that is or are employable exclusively for hand gesture recognition, and wherein the at least one contiguous portion defines an interval or intervals of travel time of the measurement signal along the signal line. In this way, the effort of detecting hand touch positionings for hand gesture recognition can be reduced by focusing on the interval or intervals of travel time of the measurement signal that is or are defined by the position of the at least one contiguous portion of the rim.

Further, a position on the rim of the steering wheel at which an operator can give input in the manner of a human machine interface (HMI), for instance for selecting or adjusting comfort functions such as multimedia functions, is well-defined and readily identifiable.

Preferably, the exclusive employment for hand gesture recognition of the portion or the portions of the at least one signal line and the defined interval or the intervals of travel time is switchable. In this way, the same design of the signal line can be used with or without the function of hand gesture recognition, which can simplify an assembly process of the steering wheel.

In preferred embodiments of the steering wheel, the exclusive employment is switchable by a parameter setting in the control and evaluation unit. By that, it can be enabled to incorporate the exclusive employment after mounting the steering wheel or even as part of a retrofit, e.g. an upgrade, without any hardware change.

Preferably, the parameter setting in the sensing system is designed as a software parameter setting within the control and evaluation unit, by which the exclusive employment for hand gesture recognition can readily be carried out at any time.

In preferred embodiments of the steering wheel, the portion or portions of the at least one signal line that is or are arranged on the at least one contiguous portion of the rim of the steering wheel is or are selectively employable for hand gesture recognition at one point in time, and is or are selectively employable at another point in time as a part of the at least one signal line to be employed in a time domain reflectometry-based measurement of an embodiment of the sensing system disclosed herein to be used for hand positioning detection on the steering wheel.

In other words, the at least one signal line can be used as a whole with a suitable sensing system being operated for hand positioning detection (i.e. touch positioning or grasping hand positioning) at one time, and it can be used with a portion or portions of the at least one signal line that are arranged on the at least one contiguous portion of the rim being exclusively employed for hand gesture recognition at another time. In this way, the sensing system and the at least one signal line can be used virtually simultaneously for providing the safety function of Hands-Off Detection and for providing additional functions, for instance comfort functions, such as multimedia functions.

In yet another aspect of the invention, a non-transitory, computer-readable medium storing a software module for controlling automatic execution of steps of an embodiment of the method disclosed herein is provided.

The method steps to be conducted are converted into a program code of the software module, wherein the program code is implementable in a digital memory unit (such as the computer-readable medium) of the sensing system disclosed herein, and is executable by a processor unit of the sensing system disclosed herein. Preferably, the digital memory unit and/or processor unit may be a digital memory unit and/or a processing unit of the control and evaluation unit of the sensing system. The processor unit may, alternatively or supplementary, be another processor unit that is especially assigned to execute at least some of the method steps.

The software module can enable a robust and reliable execution of the method and can allow for a fast modification of method steps.

These and other aspects of the invention will be apparent from and elucidated with reference to the embodiments described hereinafter.

It shall be pointed out that the features and measures detailed individually in the preceding description can be combined with one another in any technically meaningful manner and show further embodiments of the invention. The description characterizes and specifies embodiments of the invention in particular in connection with the figures.

BRIEF DESCRIPTION OF THE DRAWINGS

Further details and advantages of the present invention will be apparent from the following detailed description of not limiting embodiments with reference to the attached drawing, wherein.

In the different figures, the same parts are always provided with the same reference symbols or numerals, respectively. Thus, they are usually only described once.

DETAILED DESCRIPTION

Figure 1:
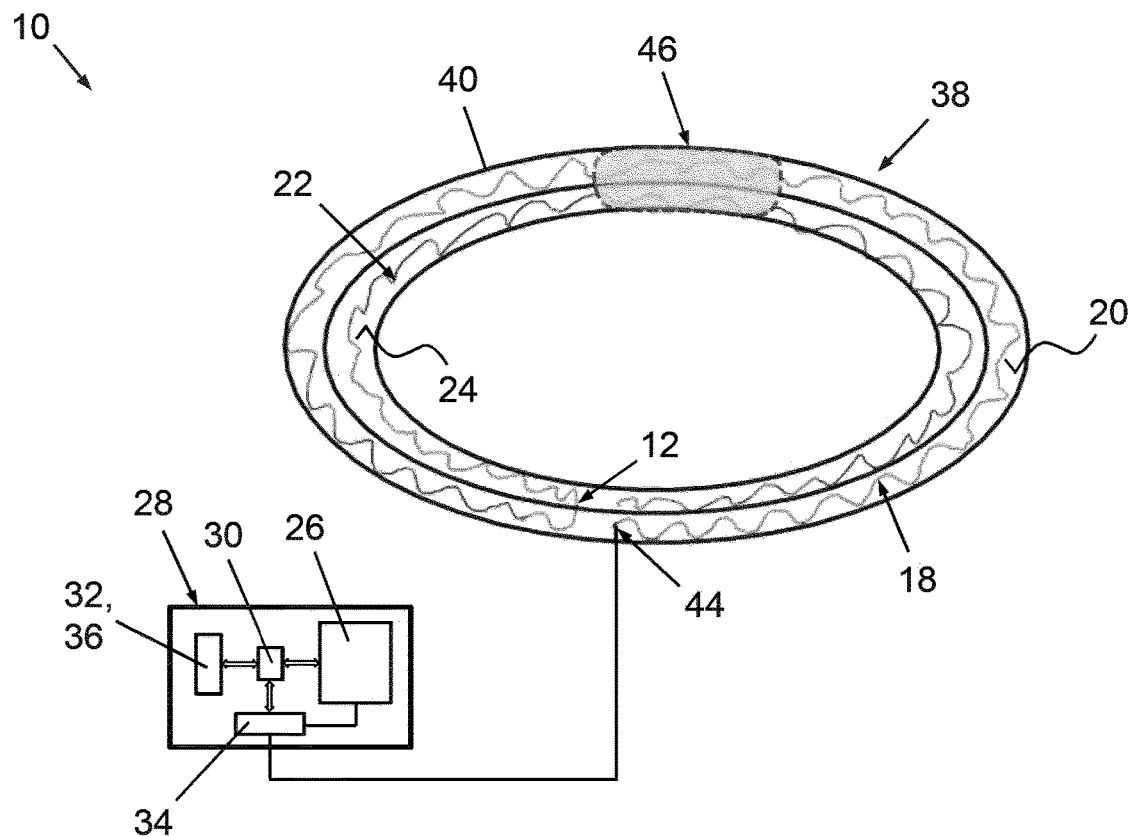
FIG. 1 schematically illustrates a sensing system in accordance with an embodiment of the invention for detection of hand gestures established by a sequence of hand touch positionings on an object formed by a rim of a steering wheel, in an installed state, FIG. 2 schematically illustrates the electrically conducting signal line of the sensing system pursuant to FIG. 1, FIG. 3 schematically illustrates the sensing system pursuant to FIG. 1 in a scenario with a hand carrying out a gesture established by a sequence of hand touch positionings on the steering wheel.

FIG. 1 schematically illustrates a sensing system for detection of hand gestures established by a sequence of hand touch positionings on an object, which is formed by a steering wheel and, more specifically, by a rim of the steering wheel, in an installed state. For clarity purposes, only the rim 40 or steering ring of the steering wheel 38 is shown, which further comprises at least one spoke that connects the rim 40 to a steering column via a hub in a manner known per se. The steering wheel 38 may be employed in a vehicle designed as a passenger car, but may as well be employed in an aircraft or a watercraft.

The sensing system 10 comprises an electrically conducting signal line 12, a signal voltage source 26 and a control and evaluation unit 28.

Figure 2:
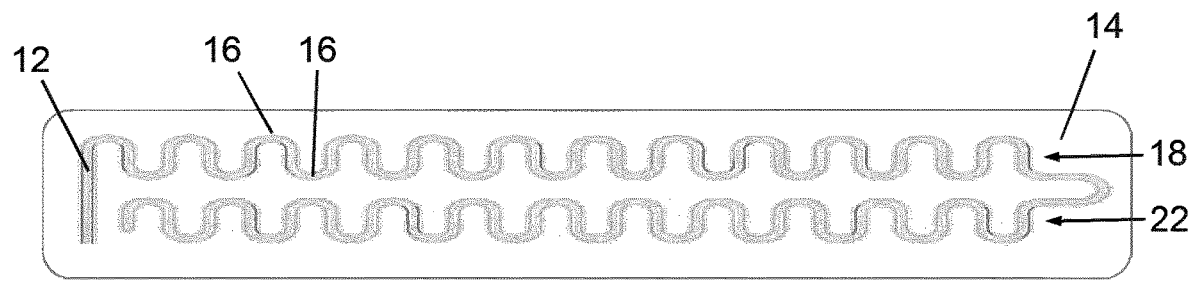

The signal line 12 of the sensing system 10 is schematically illustrated in FIG. 2. The signal line 12 may be shaped as a meandering pattern, which comprises a plurality of half-circle shaped turns connected by straight-line portions. The signal line 12 may be designed as a coplanar waveguide having an electrically conductive center line and two electrically conductive return lines, which are arranged in an equally spaced manner at both sides of the center line. The center line and the return lines may be attached to a flexible dielectric carrier 14 such as a polymeric foil, for instance by applying a screen printing method. In this way, the signal line 12 is designed to have a predefined uniform characteristic impedance, which can be laid out by varying the geometry and relative positions of the center line and the return lines, as is well known in the art.

The flexible dielectric carrier 14 may be backed by an electrically conductive ground plane serving as an additional return line of the coplanar waveguide.

The signal line 12 may be open-ended as shown in FIG. 2, but it may also be terminated by a lumped impedance that is equal to the characteristic impedance so as to avoid reflections at its end. In the open-ended case a total reflection is to be expected, which can be used as a time reference mark.

A maximum dimension between adjacent turning points 16 of the meandering pattern of the signal line 12 is adapted to a circumferential length of a cross-section of the rim 40 of the steering wheel 38 such that a maximum lateral dimension between adjacent turning points 16 of the meandering pattern is more than 25% and less than 50% of a circumferential length of the cross-section of the rim 40 of the steering wheel 38, and in this specific embodiment may be about 30% of the circumferential length.

As shown in FIG. 1, the electrically conducting signal line 12 is arranged to extend along a part of a surface of the rim 40 of the steering wheel 38. The signal line 12 comprises a first section 18, which is arranged to extend along a part of a surface 20 of the rim 40 of the steering wheel 38 that is facing an operator of the steering wheel 38, i.e. usually the driver of the vehicle. The signal line 12 further comprises a second section 22, which is arranged to extend along a part of a surface 24 of the rim 40 of the steering wheel 38 that is facing away from the operator of the steering wheel 38. The first section 18 and the second section 22 of the signal line 12 are electrically connected in series without an impedance discontinuity.

The signal line 12 is installed and arranged on the surface of the rim 40 of the steering wheel 38 with a priori knowledge about a relation between a distance of any portion of the signal line 12 from a reference point 44 and information on a position on the rim 40. Any point of the signal line 12 may be chosen as the reference point. In this specific embodiment, the reference point 44 is selected to be located at an input end of the signal line 12. A position of any portion of the signal line 12 on the rim 40 may be defined by specifying the surface, i.e. either the surface 20 facing towards the operator or the surface 24 facing away from the operator, and by specifying a center angle with respect to a zero angle position.

The steering wheel 38 further comprises a contiguous portion 46 of the rim 40 that is identifiable by an outer marking to the steering wheel operator. A portion of the signal line 12 is arranged on the contiguous portion 46 of the rim 40 that is employable exclusively for hand gesture recognition. The contiguous portion 46 defines intervals of travel time of the measurement signal along the signal line 12 with regard to the reference point 44.

The signal voltage source 26 is operatively connected to the signal line 12 and is configured for providing a time-dependent measurement signal to be traveling along the connected signal line 12. In this embodiment, the signal voltage source 26 is designed as an integral part of the control and evaluation unit 28, sharing the same housing for improved signal processing and control by the control and evaluation unit 28. In other embodiments, the signal voltage source 26 may be designed as a separate unit with appropriate signal and control lines to the signal line 12 and the control and evaluation unit 28.

In this specific embodiment, the signal voltage source 26 is designed for providing pulse-shaped signals, but in other embodiments, the signal voltage source may be configured for providing a frequency-swept signal, a pseudo random phase-shift keyed signal or a pseudo random signal.

The control and evaluation unit 28 is operatively connected to the signal line 12 as well as to the signal voltage source 26. The control and evaluation unit 28 may comprise a microcontroller that includes a digital data memory unit 32, a processor unit 30 with data access to the digital data memory unit 32 and a control interface 34. As will be explained below, the control and evaluation unit 28 is configured for automatic execution of a method of recognizing a hand gesture established by a sequence of hand touch positionings on the steering wheel 38.

The portion of the signal line 12 that is arranged on the contiguous portion 46 of the rim 40 is employable exclusively for hand gesture recognition by a software parameter setting in the control and evaluation unit 28. By setting the appropriate software parameter, the intervals of travel time of the measurement signal along the signal line 12 that are defined by the contiguous portion 46 of the rim 40 with regard to the reference point 44 will be assigned by the control and evaluation unit 28 to hand gesture recognition.

That is to say that the portions of the signal line 12 that are arranged on the contiguous portion 46 of the rim 40 of the steering wheel 38 are selectively employable for hand gesture recognition at one point in time, and are selectively employable at another point in time as parts of the signal line 12 to be employed in a time-domain reflectometry-based measurement of the sensing system 10 to be used for hand positioning detection on the steering wheel for HOD purposes and in particular for distinguishing touch positionings from hand grasping positionings. Due to the speed of operation of the sensing system 10, this is unnoticeable to the steering wheel operator.

If the software parameter was not set appropriately, the portions of the signal line 12 that are arranged on the contiguous portion 46 of the rim 40 of the steering wheel 38 would be employed in the time-domain reflectometry-based measurement of the sensing system at all times to be used for hand positioning detection on the steering wheel 38 for HOD purposes. Thus, the same sensing system hardware can be used to serve both purposes.

Figure 3:
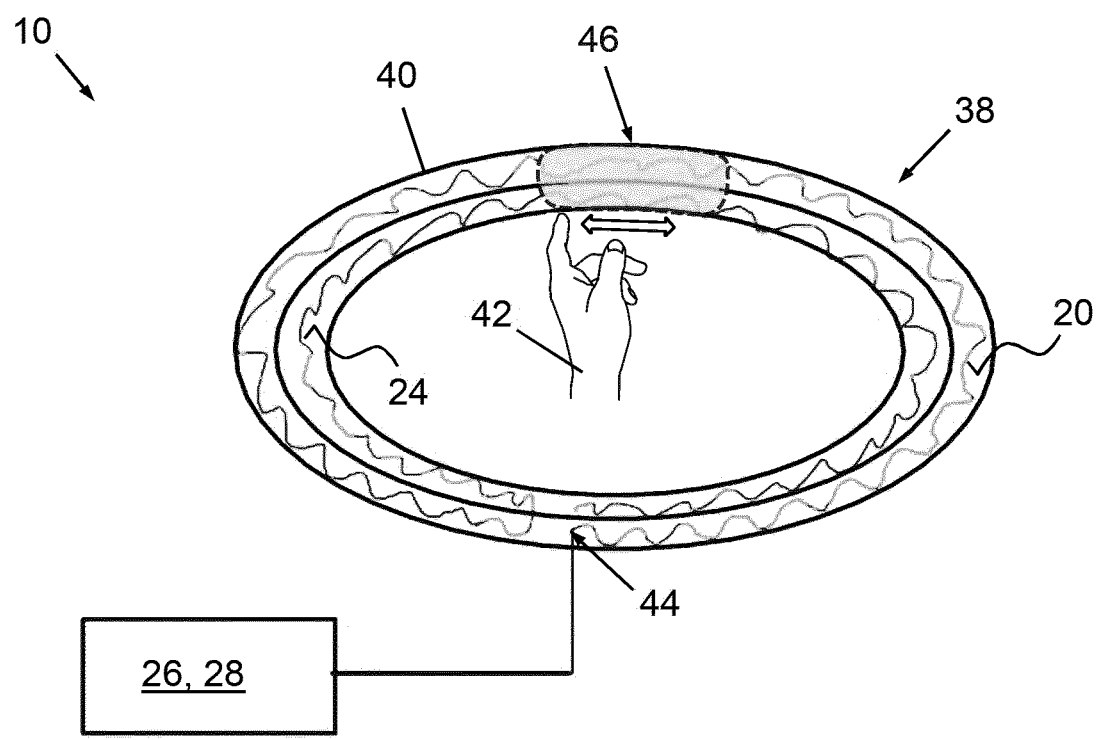
Figure 4:
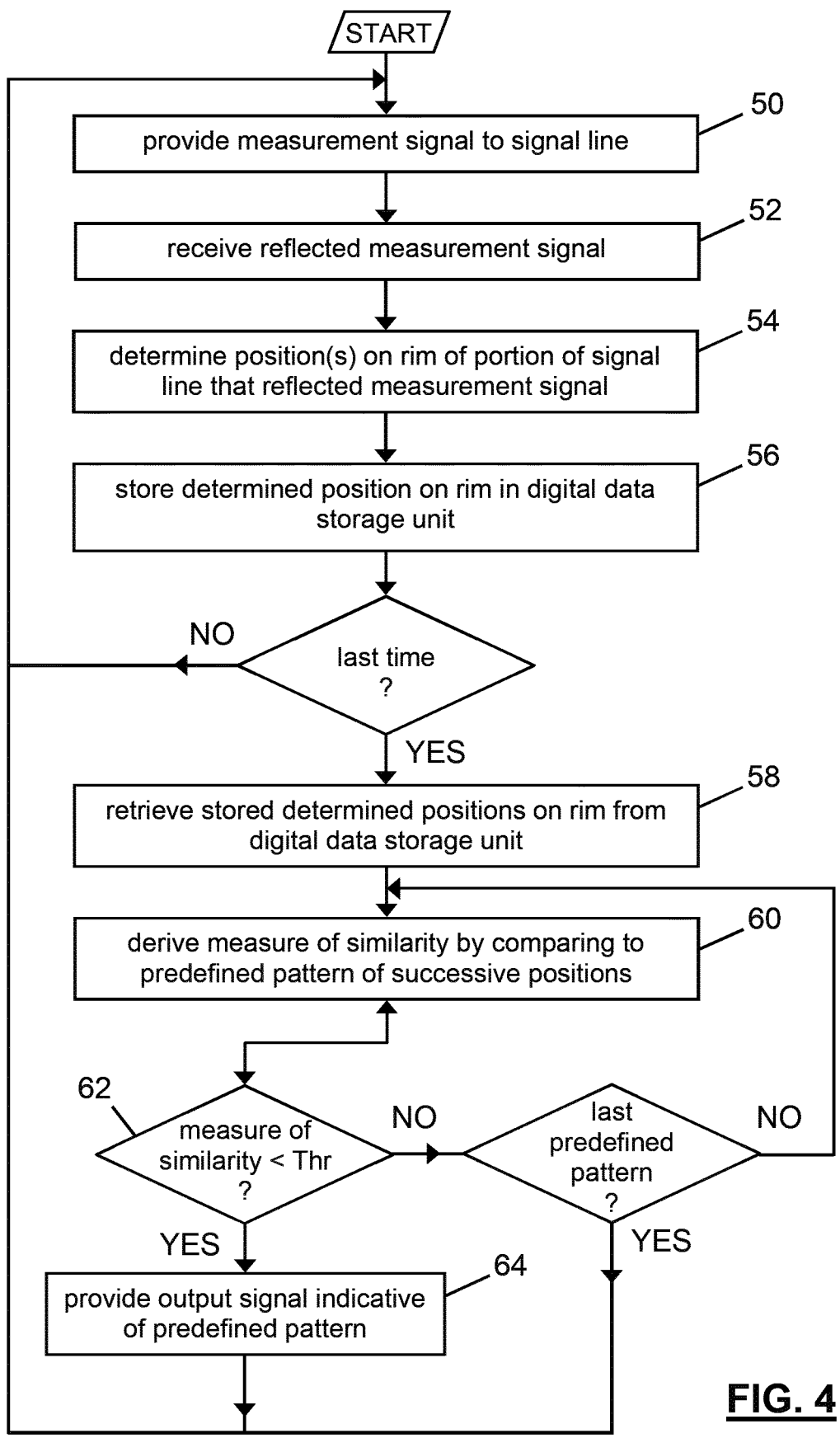
FIG. 4 is a flow chart of a method of recognizing a hand gesture established by a sequence of hand touch positionings on a steering wheel by operating the sensing system pursuant to FIG. 1.

In the following, an embodiment of the method of recognizing a hand gesture established by a sequence of hand touch positionings on an object formed by the steering wheel 38, more specifically by the rim 40 of the steering wheel 38, by operating the sensing system 10 pursuant to FIG. 1 will be described with reference to FIGS. 1 and 3, which schematically illustrates the sensing system pursuant to FIG. 1 in a scenario with a hand carrying out a gesture established by a sequence of hand touch positionings on the steering wheel, and to FIG. 4, which provides a flow chart of the method. In preparation of operating the sensing system 10, it shall be understood that all involved units and devices are in an operational state and configured as illustrated in FIG. 1.

In order to be able to automatically execute the method, the control and evaluation unit 28 comprises a software module 36. The method steps to be conducted are converted into a program code of the software module 36. The program code is implemented in the digital data memory unit 32 of the control and evaluation unit 28 and is executable by the processor unit 30 of the control and evaluation unit 28. Alternatively, the software module 36 may as well reside in and may be executable by another control unit of the vehicle, and established data communication means between the control and evaluation unit 28 and the vehicle control unit would be used for enabling mutual data transfer.

An execution of the method may be enabled or disabled by an appropriate setting of the software parameter in the control and evaluation unit 28.

In a first step 50 of the method, by operating the signal voltage source 26, a time-dependent measurement signal is provided to the signal line 12. The measurement signal is intended to be traveling along the connected signal line 12. Without any hand positioning on the steering wheel 38 and with the signal line 12 being terminated with a lumped impedance, no reflection is expected at all. The provision of the time-dependent measurement signal may be controlled by the control and evaluation unit 28. In other embodiments, the provision of the time-dependent measurement signal may be used as a trigger signal for the control and evaluation unit 28 for commencing execution of the following steps.

In another step 52 of the method, the control and evaluation unit 28 is operated for receiving the measurement signal after being at least partially reflected by at least one portion of the signal line 12 (also referred to as received reflected measurement signal).

In a next step 54, the control and evaluation unit 28 is operated to determine positions on the rim 40 of the portions of the signal line 12 that have at least partially reflected the measurement signal. This is obtained by using the a priori knowledge about the relation between a distance of any portion of the signal line 12 from the reference point 44 (FIG. 2) and information on a position on the rim 40 (FIG. 3).

Due to the software parameter setting in the control and evaluation unit 28, a determined position on the rim 40 that corresponds to a travel time of the measurement signal that lies within the interval of travel time defined by the contiguous portion 46 of the rim 40 is considered by the control and evaluation unit 28 to be generated by a hand touch positioning on the steering wheel 40 that is part of a sequence of hand touch positionings establishing a hand gesture.

In a further step 56 of the method, the determined positions on the contiguous portion 46 of the rim 40 are stored in the digital data memory unit 32.

The described steps 50-56 of providing the measurement signal to the signal line 12, of receiving the measurement signal after being reflected, of determining positions of the portions of the signal line 12 that reflected the measurement signal, and of storing the determined positions are repeated for a predetermined number of times. The predetermined number of times corresponds to a time period that can lie between 0.5 and 1.5 seconds, and that in this specific embodiment may be selected to be 1.0 seconds. During this time, the steering wheel operator may carry out a hand gesture that may include a back and forth wiping gesture on the contiguous portion 46 of the rim 40.

As a result, a plurality of stored successively determined positions on the rim 40 is obtained. In another step 58, the plurality of stored determined positions is retrieved from the digital data storage unit 32. In a next step 60, the plurality of stored determined positions is compared with a predefined pattern of successive positions to derive a measure of similarity. The predefined pattern of successive positions includes a turning point with regard to a circumferential direction of the rim 40.

The derived measure of similarity is compared with a predefined threshold value Thr in another step 62. If the derived measure of similarity is lower than the predefined threshold value Thr, an output signal is provided by the control and evaluation unit 28 in another step 64 that is indicative of the predefined pattern of successive positions, which in turn is representative of a specific hand gesture. If the derived measure of similarity is equal to or larger than the predefined threshold value Thr, the plurality of stored determined positions is compared with another predefined pattern of successive positions to derive another measure of similarity. This is repeated until the derived measure of similarity is lower than the predefined threshold value Thr for one of the predefined patterns of successive positions, or until the plurality of stored successively determined positions failed to match with any of the predefined patterns of successive positions.

While the invention has been illustrated and described in detail in the drawings and foregoing description, such illustration and description are to be considered illustrative or exemplary and not restrictive; the invention is not limited to the disclosed embodiments.

Other variations to be disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality, which is meant to express a quantity of at least two. The mere fact that certain measures are recited in mutually different dependent claims does not indicate that a combination of these measures cannot be used to advantage. Any reference signs in the claims should not be construed as limiting scope.

The invention claimed is:

1. A method of recognizing a hand gesture established by a sequence of hand touch positionings on an object, particularly on a steering wheel by operating a sensing system comprising at least one electrically conducting signal line, which is arranged to extend along a part of a surface of the object with a priori knowledge about a relation between a distance of any portion of the at least one signal line from a reference point (44) and information on a position on the object, a signal voltage source that is operatively connectable to each signal line, and a control and evaluation unit that is operatively connectable to each signal line, the method comprising at least steps of:

by operating the signal voltage source, providing (50) to a signal line a time-dependent measurement signal intended to be traveling along the respective connected signal line, operating the control and evaluation unit for receiving (52) the measurement signal after being at least partially reflected by at least one portion of the signal line to which the measurement signal has been provided, operating the control and evaluation unit for determining (54) a position or positions on the object of the portion of the portions of the signal line that has or have at least partially reflected the measurement signal, storing (56) the determined position or positions on the object, repeating the aforementioned steps (50, 52, 54, 56) for a predetermined number of times for obtaining a plurality of stored successively determined positions on the object, comparing the obtained plurality of stored successively determined positions on the object with at least one predefined pattern of successive positions to derive (60) a measure of similarity, and providing (64) an output signal that is indicative of the predefined pattern of successive positions when the derived measure of similarity is lower than a predefined threshold value.

2. The method as claimed in claim 1, wherein an execution of the steps (50-52, 60, 64) can be enabled or disabled by a parameter setting in the sensing system.

3. The method as claimed in claim 1, wherein the step of repeating the aforementioned steps (50, 52, 54, 56) includes repeating the steps (50, 52, 54, 56) for a predetermined number of times corresponding to a time period between 0.5 and 1.5 seconds.

4. The method as claimed in claim 1, wherein the object is formed by a rim of a steering wheel, and wherein the at least one predefined pattern of successive positions includes a turning point with regard to a circumferential direction of the rim of the steering wheel.

5. A sensing system for detection of hand gestures established by a sequence of hand touch positionings on an object, comprising:

at least one electrically conducting signal line, which is arrangeable to extend at least along a part of a surface of an object with a priori knowledge about a relation between a distance of any portion of the at least one signal line from a reference point and information on a position on the object, a signal voltage source that is operatively connectable to each signal line and that is configured for providing a time-dependent measurement signal to be traveling along the respective connected signal line, and a control and evaluation unit that is operatively connectable to each signal line and that is configured for:

receiving (52) the measurement signal after being at least partially reflected by at least one portion of the signal line to which the measurement signal has been provided, determining (54) a position or positions on the object of the portion or portions of the signal line that has or have at least partially reflected the measurement signal, storing (56) the determined position or positions on the object, repeating the aforementioned steps (52, 54, 56) for a predetermined number of times for obtaining a plurality of stored successively determined positions on the object, comparing the obtained plurality of stored successively determined positions on the object with at least one predefined pattern of successive positions to derive (60) a measure of similarity, and providing (64) an output signal that is indicative of the predefined pattern of successive positions when the derived measure of similarity is lower than a predefined threshold value.

6. A steering wheel with hand gesture recognition by hand touch positioning detection, comprising a sensing system as claimed in claim 5, wherein the at least one electrically conducting signal line is arranged to extend along a part of a surface of a rim of the steering wheel.

7. The steering wheel as claimed in claim 6, further comprising at least one contiguous portion of the rim of the steering wheel that is identifiable by an outer marking, wherein a portion is or portions of the at least one signal line are arranged on the at least one contiguous portion of the rim that are employable exclusively for hand gesture recognition, and wherein the at least one contiguous portion defines an interval or intervals of travel time of the measurement signal along the signal line.

8. The steering wheel as claimed in claim 7, wherein the exclusive employment for hand gesture recognition of the portion or the portions of the at least one signal line and the defined interval or the intervals of travel time is switchable.

9. The steering wheel as claimed in claim 7, wherein the exclusive employment is switchable by a parameter setting in the control and evaluation unit.

10. The steering wheel as claimed in claim 7, wherein the portion or portions of the at least one signal line that is or are arranged on the at least one contiguous portion of the rim of the steering wheel is or are selectively employable for hand gesture recognition at one point in time, and is or are selectively employable at another point in time as a part of the at least one signal line to be employed in a time-domain reflectometry-based measurement of the sensing system.

11. A non-transitory, computer-readable medium having stored thereon a software module for controlling automatic execution of the method as claimed in claim 1, wherein method steps of the method comprise a program code of the software module, wherein the program code is executable by a processor unit.

* * * * *